United States Patent [19]

Chalin

[11] Patent Number: 5,213,352
[45] Date of Patent: May 25, 1993

[54] BENT TUBE STEERING AXLE ASSEMBLY

[75] Inventor: Thomas N. Chalin, Garland, Tex.

[73] Assignee: Watson & Chalin Manufacturing, Inc., Rowlett, Tex.

[21] Appl. No.: 821,637

[22] Filed: Jan. 16, 1992

[51] Int. Cl.⁵ ............................................. B62D 7/18
[52] U.S. Cl. ................................. 280/96.1; 280/673; 180/257
[58] Field of Search ............... 280/93, 96.1, 973, 96.3, 280/661; 180/257

[56] References Cited

U.S. PATENT DOCUMENTS

| | | | |
|---|---|---|---|
| 1,783,614 | 12/1930 | Griswold | 280/673 |
| 2,092,611 | 9/1937 | Olley | 280/661 |
| 2,297,901 | 10/1942 | Leighton | 280/93 |
| 3,441,288 | 4/1969 | Boughner | 280/96.1 |
| 4,286,799 | 9/1981 | Ayres | 280/96.1 |

Primary Examiner—Kenneth R. Rice
Attorney, Agent, or Firm—Bernard A. Reiter

[57] ABSTRACT

A new and improved kingpin housing assembly operatively coupling the wheel mounting assembly, the front axle and the steering assembly with the help of kingpin. The kingpin housing assembly is provided with upper and lower arm supports. The lower arm support provides a new and improved locking mechanism to keep the kingpin in place. For the kingpin housing assembly to function efficiently, the kingpin used to couple the wheel mounting assembly to the front axle must always be securely held in place to prevent wear and tear during road shocks and rapid steering maneuvers. The kingpin is held in place with the help of a locking cap received into the lower arm support and locked in place with the help of a nut and bolt combination. The lower arm support is provided with castellations along the bottom circumference. A horizontal bore is provided in the locking cap across its diameter. Once the horizontal bore and the notches formed by the castellations are aligned, the nut and bolt combination is passed there through to prevent the locking cap screw from becoming displaced from the adjusted position and thereby securely holding the kingpin in place.

10 Claims, 2 Drawing Sheets in# BENT TUBE STEERING AXLE ASSEMBLY

BACKGROUND

1. Field of Invention

This invention relates to certain new and useful improvements to kingpin bearing assemblies and, more particularly, to an adjustable assembly for the kingpin assembly, and also more particularly to the mountings therefor.

2. Prior Art

The prior art reveals several patents describing kingpin bearing assemblies. For example, the patent to Meggs (U.S. Pat. No. 1,859,149) pertains more particularly to stub axle construction and to mountings thereof. Meggs shows a kingpin that is held up by an adjustable element consisting of a bearing cap and a spacing washer with a tongue projecting to fit within a raceway on the inner wall of the housing assembly. The tongue provides a locking means when the bearing cap is screwed on to attain the assemblage and to prevent displacement from the adjusted position.

Another teaching includes the patent to Smiley (U.S. Pat. No. 2,512,881) of a kingpin bearing assembly. An externally threaded nut, generally is screwed into the lower support to trap the kingpin in place. This nut carries a plate which has a plurality of notches. The nut provides the means for adjusting the kingpin bearings and has a lever locking means to hold the adjustments.

Still further the patent to Glander (U.S. Pat. No. 2,665,957) shows a kingpin with a threaded bolt ending and upon which a castellated nut is screwed to hold the kingpin in place. A cotter pin is inserted in a castellated nut and the kingpin to secure the adjustment.

Also the patent to White (U.S. Pat. No. 3,288,485) provides a kingpin and assembly secured by a bolt running axially along the kingpin and through the housing assembly. The bolt is threaded at one end and capped at the other end. At the threaded end, the castellated nut is adjusted to secure the kingpin inside the housing assembly, and whereupon a cotter pin is inserted through the castellated nut and the bolt to secure the adjustment.

SUMMARY OF THE INVENTION

The kingpin of the present invention is tapered with the bottom of the kingpin being larger than the top, and is carried in the spaced upper and lower arm supports of the kingpin housing assembly. The kingpin is held in place by a locking cap which has external threads, and which is received in the lower arm support of the kingpin housing assembly. The bottom circumference of the lower arm support is castellated. A single elongated bore is formed in the locking cap through which a nut-and-bolt combination is inserted. In the alternative, a plurality of bores may be formed to selectively insert the nut-and-bolt combination. (Optionally, also sandwiched in between the kingpin and the locking cap is a load-carrying thrust bearing). Once the locking cap has been screwed into the lower arm support of the kingpin housing assembly, the nut-and-bolt combination is passed through the bore and through opposing castellations to prevent the locking cap from becoming displaced from the adjusted position.

A major object of the present invention is to provide an easily adjustable kingpin housing assembly. A further object of the present invention is to secure the adjustment in the kingpin housing assembly so that the adjustment does not become displaced upon vibration and movement of the vehicle. Accordingly, a locking means is provided to secure the adjusted position of the kingpin in relation to the kingpin housing assembly. A still further object of the present invention is to provide a kingpin housing assembly in which there is less opportunity for wear and tear of the parts involved therein. Accordingly, a thrust bearing is optionally provided beneath the kingpin to provide a substantially frictionless movement of the kingpin if greasing is not adequate. A yet further object of the present invention is to provide lubrication to the kingpin housing assembly. Accordingly grease plugs are provided through which lubricant may penetrate into the kingpin housing assembly. Another object of the present invention is to provide a kingpin housing assembly which is readily accessible and permits adjustments to be made quickly without the loss of the use of the automobile for extended periods. Thus, a castellated bottom circumference is provided in the kingpin housing assembly with a locking cap which may be easily disassembled and serviced. The castellated bottom circumference provides the locking means to securely adjust the inserted locking cap to the adjusted position. The locking cap is further provided with an elongated slot to provide for easy adjustment and locking at the appropriate force. In the alternative, staggered bores for selectively inserting said nut-and-bolt combination may be provided.

The foregoing and other objects, features and advantages of the invention will be apparent from the following more particular description of a preferred embodiment of the invention as illustrated in the accompanying drawings.

DESCRIPTION OF THE PREFERRED EMBODIMENTS

Figure 1:
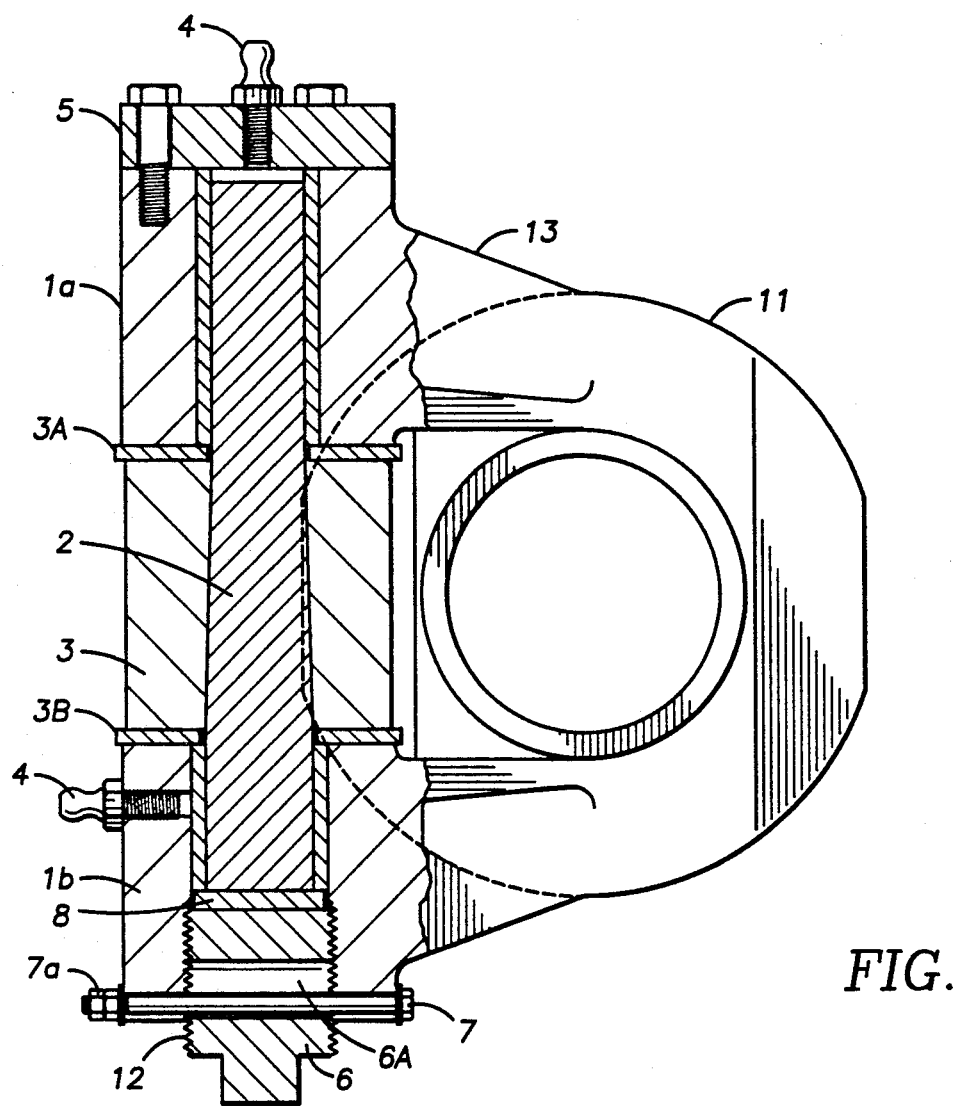
FIG. 1 is the side view of the kingpin housing assembly showing the upper and lower arm supports, the axle, the kingpin and the locking cap.

Referring now to the drawings, the present invention will be described with more particularity.

Generally, at the front end of a vehicle, the axle assembly, the steering assembly, and the wheel mounting assembly are operatively coupled with each other at a single point to form the kingpin housing assembly. The present invention relates to the kingpin housing assembly. Certain alternative modifications to the preferred embodiment will be described later.

Figure 3:
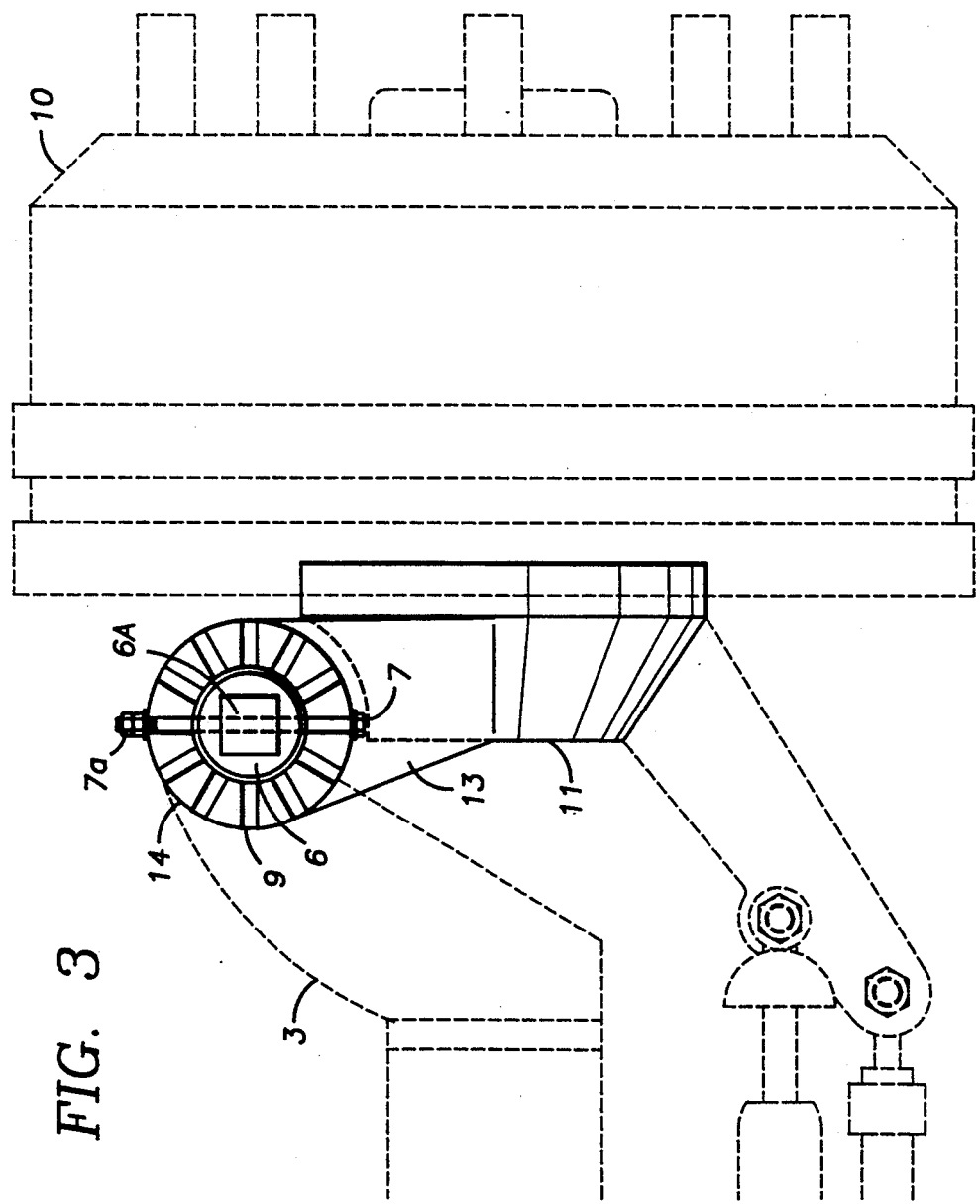
FIG. 3 shows a bottom view of the kingpin housing assembly in relation to the axle and the wheel.

FIG. 3 illustrates a bottom cross-sectional view of a conventional kingpin housing assembly 13, disclosing the axle 3, the wheel mounting assembly 11, the steering assembly 15. FIG. 3 shows the wheel mount 10 operatively coupled to the kingpin housing assembly 13. The steering mechanism assembly 15, is operatively coupled to the kingpin housing assembly 13. The bent tube axle 3 sits in between the upper and lower arm supports 1a and 1b, respectively, of the kingpin housing assembly 13. The axle 3 is mounted to the vehicle in operative association with the shock-absorber and spring assemblies (not shown here). The kingpin housing assembly 13 is mobile and turns along the longitudinal axis of the kingpin 2 in relation to the bent tube axle 3.

Referring now to FIG. 1, the side cross-sectional view of the kingpin housing assembly 13 discloses an upper arm support 1a, and a lower arm support 1b. The upper and lower arm supports 1a and 1b, respectively, have aligned bores to house the kingpin 2. As previously mentioned, the axle 3 is disposed in between the upper and lower arm supports 1a and 1b, respectively. The axle also has a bore aligned with the upper and lower arm support bores. The upper and lower arm supports 1a and 1b, respectively, and the axle 3 are coupled by the kingpin 2 upon alignment of the three bores.

The kingpin 2 is tapered at its upper end and said upper end is housed in the upper arm support 1a. The upper arm support 1a is capped off with an upper cap 5. The upper cap 5 is bolted to the upper arm support 1a. A grease plug 4 is provided on the upper cap 5 to lubricate the upper arm support 1a. Inserted between the upper and lower arm supports 1a and 1b, respectively, and the axle 3, are the upper and lower bushings 3a and 3b, respectively. The upper and lower bushings 3a and 3b, respectively, seal the upper and lower arm supports 1a and 1b, respectively, so that the grease will not be lost from crevices between said axle 3 and said upper and lower arm supports 1a and 1b, respectively.

The lower arm support 1b houses the bottom end of the kingpin 2, the thrust bearing 8, the locking cap 6, the nut and bolt combination 7a and 7, respectively, and a grease plug 4. The lower arm support 1b has the unique and novel castellated bottom circumference 9 to hold the locking cap 6 in place with the help of a nut and bolt combination 7a and 7, respectively. After the insertion of the kingpin 2 through the bore of the lower support arm 1b, a thrust bearing 8 is inserted. The locking cap 6 follows the thrust bearing 8. The optional thrust bearing 8 provides for a substantially frictionless motion of kingpin 2 in relation to the locking cap 6 preventing wear and tear.

Figure 2:
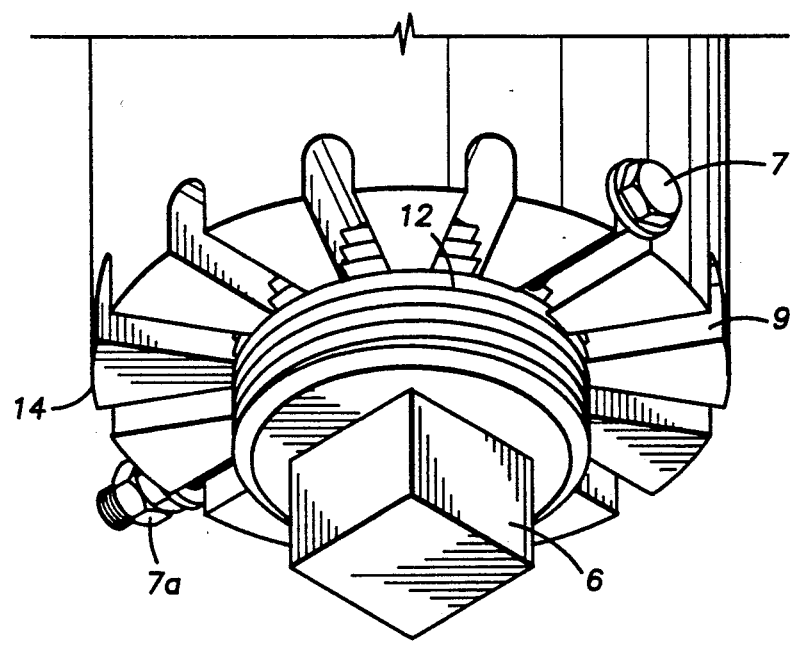
FIG. 2 is a perspective view of the castellated lower arm support including the threaded locking cap and the nut and bolt combination.

As shown in FIG. 2, the lower arm support 1b has a plurality of notches 9 in radially opposite ends to provide a locking mechanism for the locking cap 6 holding the kingpin 2 up in an adjusted position. This castellated bottom circumference 14 provides an easy yet powerful safety device to keep the kingpin 2 in place. A nut and bolt combination 7a and 7, respectively, is passed through a first notch 9 in the castellated bottom circumference 14, then through the radially slotted bore 6a in the locking cap 6, and out again through a second notch 9 to lock locking cap 6 in place at the adjusted position. The radially slotted bore 6a across the diameter of the locking cap 6 provides for easy adjustment because the height of the slot 6a, along the axial length of the locking cap 6, is large. Thus, despite the locking cap 6 being received deep into the lower arm support 1b, a radially slotted bore 6a will be available through which the nut and bolt combination 7a and 7, respectively, may be passed. The nut 7a of the nut and bolt combination 7a and 7, respectively, is further made safe by a double nut combination 7a.

Figure 4:
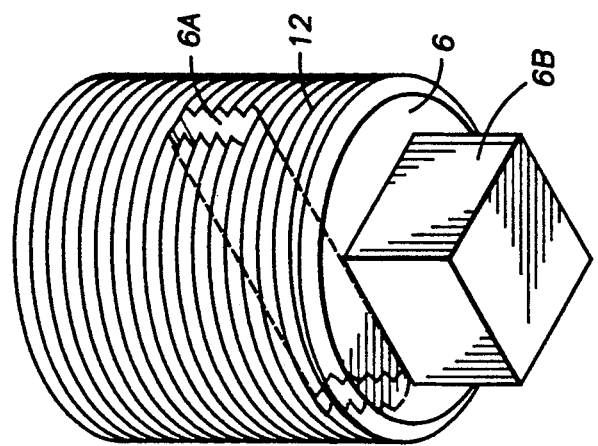
FIG. 4 shows a perspective view of the locking cap with a notch and a nut and bolt combination passing therethrough.

FIG. 4 illustrates the locking cap 6 and its radially slotted bore 6a providing a means for adjustment of the tapered kingpin 2. The locking cap 6 is provided with a square protrusion 6b so that it may be easily loosened or tightened with the help of a wrench. The threading 12 of the locking cap 6 is easily received into the lower arm support 16, and provides a further basis upon which the kingpin 2 is held in place. The unique castellated bottom circumference 14 provides a good and safe looking mechanism which prevents the locking cap 6 from being displaced and the kingpin 2 becoming dislodged. This is especially important because the kingpin 2 and the upper and lower arm supports 1a and 1b, respectively, are subject to many vibrations and road shocks, as well as, rapid steering maneuvers that wear develops relatively rapidly. As a result, a general lessening of steering wheel control occurs. The wear necessitates the replacement of the kingpin 2 and/or the upper and lower arm supports 1a and 1b, respectively, resulting in a laborious expensive undertaking as well as the loss of the use of the vehicle for lengthy periods. The present invention, as shown by the preferred embodiment herein, prevents wear to a great extent and practically eliminates kingpin wear and tear, lengthening the life of the vehicle.

Thus, it is apparent that there has been provided, in accordance with the invention, a new and improved kingpin housing assembly 13. The lower arm support 1b of the kingpin housing assembly 13 is provided with a unique and locking mechanism to keep the kingpin 2 in place to prevent wear.

While the invention has been described in conjunction with specific embodiments thereof, it is evident that many alternatives, modifications and variations will be apparent to those skilled in the art in light of the foregoing description. For example, the locking cap 6 may be altered to directly receive the bottom part of the kingpin 2 when the optional thrust bearing 8 is not used. The locking cap 6, according to this modification, would have an indentation or a cup means to receive the kingpin 2. The kingpin 2 would similarly be provided with an extension or protrusion to fit into said cup means to eliminate the need for the thrust bearing 8. Although this arrangement may eliminate the need for a thrust bearing 8, it may not be the most efficient approach to solving the friction problem. Another modification could be the addition of a castellated nut in the nut and bolt combination. The bolt would be provided with a slot to insert a cotter pin therein. Such a modification would prevent the nut and bolt combination from becoming dislodged thereby further bolstering the safety of the locking cap 6. Or in the alternative, a cotter pin may be used instead of the nut-and-bolt combination. Further, the locking cap may be modified to include a plurality of radial bores instead of a single elongate radially-slotted bore 6a for the insertion of said nut-and-bolt combination, 7a & 7, respectively.

Accordingly, this patent is intended to embrace all such alternatives, modifications, and variations as fall within the spirit of the invention and scope of the appended claims.

What is claimed is:

1. A kingpin housing assembly uniting the front axle, the wheel mounting assembly and the steering assembly of a motor vehicle comprising:

a) an upper and a lower arm support, each said arm support having a vertically aligned bore;

b) an axle member having a vertically aligned bore positioned between said upper and lower arm supports;

c) a kingpin extending through said bore in said lower arm support, said bore in said axle member, and said bore in said upper arm support;

d) an upper cap attached to said upper arm support to seal said upper arm support;

e) a load-carrying thrust bearing located below said kingpin providing for a substantially frictionless motion of said kingpin preventing wear and tear;

f) a locking cap having a horizontally aligned bore, and said locking cap is thread-fittedly received into said bore in said lower arm support;

g) said lower arm support having castellations along the bottom circumference forming notches along said bottom circumference;

h) a nut and bolt combination inserted through said notches and said horizontally aligned bore in said locking cap to prevent displacement of said locking cap from an adjusted force relation between said locking cap and said kingpin; and i) said upper and lower arm supports each having a grease plug for inserting grease.

2. The kingpin housing assembly of claim 1, wherein said upper arm support comprises:

a) a member extending from said wheel mounting assembly and terminating in a hollow cylindrical housing;

b) said hollow cylindrical housing having a flat top circumference;

c) said upper cap being attached to said flat top circumference by a plurality of bolts;

d) said hollow cylindrical housing supporting said upper end of said kingpin.

3. The kingpin housing assembly of claim 2, wherein said upper cap comprises:

a flat circular plate forming a cover for said hollow cylindrical housing upper support arm to seal said upper arm support.

4. The kingpin housing assembly of claim 1, wherein said lower arm support comprises:

a) a member extending from said wheel mounting assembly and terminating in a hollow cylindrical housing having a castellated bottom circumference forming a plurality of notches along said bottom circumference; and, b) said hollow cylindrical horsing having threads within said housing to receive said locking cap.

5. The kingpin housing assembly of claim 1 wherein said locking cap comprises:

a) a cylindrical member threaded along its length to be received into said hollow cylindrical housing of said lower arm support;

b) said cylindrical member having a radially-slotted bore across its diameter to pass said nut-and-bolt combination there through;

c) said cylindrical member having a square protrusion so that a wrench may easily displace said threadfittedly locking cap upon being unscrewed.

6. The kingpin housing assembly of claim 5 wherein: said radially-slotted bore across the diameter of said locking cap provides for easy adjustment of said locking cap relative to said lower arm support because the height of said radially-slotted bore along the axial length of the locking cap is relatively large, and therefore, as said locking cap is received into said lower arm support, said radially-slotted bore is still available for the insertion of said nut and bolt combination.

7. The kingpin housing assembly of claim 5 wherein: said locking cap is received into said hollow cylindrical housing of said lower arm support, and locked into position by passing said nut-and-bolt combination through said notches on said castellated bottom circumference and said radially-slotted bore in said locking cap to thereby prevent said locking cap from becoming displaced by the jarring motion of said kingpin housing assembly and thereby losing the adjusted force relation between said locking cap and said kingpin.

8. A kingpin housing assembly uniting the front axle assembly and the wheel mounting assembly of a motor vehicle by a kingpin comprising an upper and a lower arm support having vertically aligned bores, a front axle member having a vertically aligned bore and inserted between said upper and lower arm supports, and wherein said lower arm support comprises:

a) a hollow cylindrical housing holding said kingpin;

b) said hollow cylindrical housing having a bottom open-end through which said kingpin is inserted;

c) said hollow cylindrical housing having castellations along the bottom circumference of said hollow cylindrical housing;

d) said hollow cylindrical housing having a threaded locking cap received in said bottom open-end to hold said kingpin in place;

e) said threaded locking cap having a radially-slotted bore along its diameter;

f) a nut-and-bolt combination securing said threaded locking cap in place upon having said castellations and said radially-slotted bore aligned to pass said nut-and-bolt combination there through, and thereby securely holding said kingpin in an adjusted position with an appropriate force relationship with said kingpin; and g) said hollow cylindrical housing having a grease plug for inserting grease into said hollow cylindrical housing.

9. A kingpin housing assembly uniting the front axle assembly and the wheel mounting assembly of a motor vehicle by a kingpin comprising an upper and a lower arm support having vertically aligned bores, a front axle member having a vertically aligned bore and inserted between said upper and lower arm supports, and wherein said lower arm support comprises:

a) a hollow cylindrical housing holding said kingpin;

b) said hollow cylindrical housing having a bottom open-end through which said kingpin is inserted;

c) said hollow cylindrical housing having castellations along the bottom circumference of said hollow cylindrical housing;

d) said hollow cylindrical housing having a threaded locking cap received in said bottom open-end to hold said kingpin in place;

e) said threaded locking cap having a plurality of radial bores along its diameter;

f) a nut-and-bolt combination securing said threaded locking cap in place by inserting said nut-and-bolt combination through said castellations and a selectively aligned radial bore to thereby securely hold said kingpin in an adjusted position with an appropriate force relationship with said kingpin; and g) said hollow cylindrical housing having a grease plug for inserting grease into said hollow cylindrical housing.

10. A kingpin housing assembly uniting the front axle assembly and the wheel mounting assembly of a motor vehicle by a kingpin comprising an upper and a lower arm support having vertically aligned bores, a front axle member having a vertically aligned bore and inserted between said upper and lower arm supports, and wherein said lower arm support comprises:
a) a hollow cylindrical housing holding said kingpin;
b) said hollow cylindrical housing having a bottom open-end through which said kingpin is inserted;
c) said hollow cylindrical housing having castellations along the bottom circumference of said hollow cylindrical housing;
d) said hollow cylindrical housing having a threaded locking cap received in said bottom open-end to hold said kingpin in place;
e) said threaded locking cap having a plurality of radial bores along its diameter;
f) a nut-and-bolt combination securing said threaded locking cap in place by inserting said nut-and-bolt combination through said castellations and a selectively aligned radial bore, to thereby securely hold said kingpin in an adjusted position with an appropriate force relationship with said kingpin and
g) said hollow cylindrical housing having a grease plug for inserting grease into said hollow cylindrical housing.

* * * * *